United States Patent
Clark et al.

(10) Patent No.: US 11,003,582 B2
(45) Date of Patent: May 11, 2021

(54) CACHE UTILIZATION OF BACKING STORAGE FOR AGGREGATE BANDWIDTH

(71) Applicant: Intel Corporation, Santa Clara, CA (US)

(72) Inventors: Chace Clark, Hillsboro, TX (US); Francis Corrado, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/143,734

(22) Filed: Sep. 27, 2018

(65) Prior Publication Data
US 2019/0042452 A1    Feb. 7, 2019

(51) Int. Cl.
| G06F 12/0888 | (2016.01) |
| G06F 12/0804 | (2016.01) |
| G06F 12/0866 | (2016.01) |
| G06F 13/16 | (2006.01) |
| G06F 3/06 | (2006.01) |

(52) U.S. Cl.
CPC .......... *G06F 12/0888* (2013.01); *G06F 3/061* (2013.01); *G06F 3/0608* (2013.01); *G06F 3/0625* (2013.01); *G06F 3/0634* (2013.01); *G06F 3/0653* (2013.01); *G06F 3/0679* (2013.01); *G06F 12/0804* (2013.01); *G06F 12/0866* (2013.01); *G06F 13/161* (2013.01); *G06F 13/1642* (2013.01); *G06F 2212/1024* (2013.01); *G06F 2212/2022* (2013.01)

(58) Field of Classification Search
CPC .......... G06F 2212/1024; G06F 3/0625; G06F 3/0679; G06F 3/0634; G06F 2212/2022; G06F 3/0608; G06F 3/13; G06F 3/161; G06F 12/0804; G06F 3/0653; G06F 12/0246; G06F 2212/7203; G06F 13/1642; G06F 12/0888; G06F 12/0866; G06F 3/061; G06F 12/2212; G06F 12/7203; G06F 13/161
See application file for complete search history.

(56) References Cited

U.S. PATENT DOCUMENTS

| 8,489,820 B1 * | 7/2013 | Ellard | G06F 12/0246 711/120 |
| 2015/0286438 A1 * | 10/2015 | Simionescu | G06F 12/0246 711/103 |
| 2016/0147443 A1 * | 5/2016 | van Riel | G06F 3/061 |

OTHER PUBLICATIONS

Stan Gibilisco, "Definition—Write Through", https://whatis.techtarget.com/definition/write-through, Jul. 2012 (Year: 2012).*

* cited by examiner

*Primary Examiner* — David Yi
*Assistant Examiner* — Zubair Ahmed
(74) *Attorney, Agent, or Firm* — Jordan IP Law, LLC

(57) ABSTRACT

An embodiment of a semiconductor apparatus may include technology to determine workload-related information for a persistent storage media and a cache memory, and aggregate a bandwidth of the persistent storage media and the cache memory based on the determined workload information. Other embodiments are disclosed and claimed.

17 Claims, 9 Drawing Sheets

CACHE UTILIZATION OF BACKING STORAGE FOR AGGREGATE BANDWIDTH

TECHNICAL FIELD

Embodiments generally relate to storage systems. more particularly, embodiments relate to cache utilization of backing storage for aggregate bandwidth.

BACKGROUND

A persistent storage device, such as a solid state drive (SSD) may include media such as NAND memory. A SSD may utilize cache memory technology in addition to the mass storage media. Such cache memory technology may include volatile or non-volatile memory.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three-dimensional (3D) crosspoint memory device, or other byte addressable write-in-place nonvolatile memory devices. A memory device may also include random access memory (RAM). In one embodiment, the memory device may be or may include memory devices that use chalcogenide glass, multi-threshold level NAND flash memory, NOR flash memory, single or multi-level Phase Change Memory (PCM), a resistive memory, nanowire memory, nonvolatile RAM (NVRAM), ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
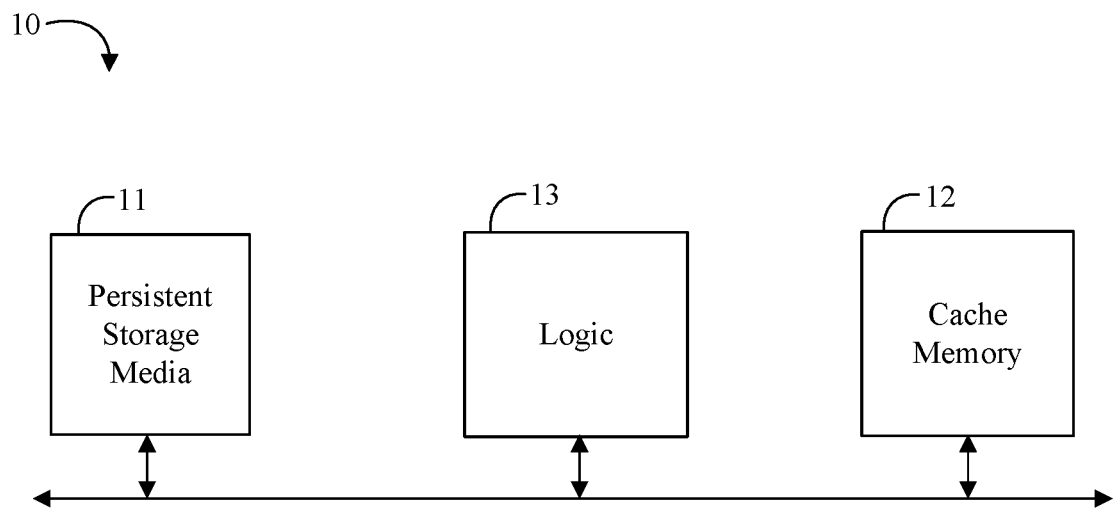
FIG. 1 is a block diagram of an example of an electronic storage system according to an embodiment.

Turning now to FIG. 1, an embodiment of an electronic storage system 10 may include persistent storage media 11, cache memory 12, and logic 13 communicatively coupled to the persistent storage media 11 and the cache memory 12 to determine workload-related information for the persistent storage media 11 and the cache memory 12, and aggregate a bandwidth of the persistent storage media 11 and the cache memory 12 based on the determined workload information. For example, the logic 13 may be configured to send an overflow IO operation to the persistent storage media 11 based on the determined workload-related information. In some embodiments, the logic 13 may be further configured to determine first load-related information for the persistent storage media 11, determine second load-related information for the cache memory 12, and determine whether to send an IO request to the cache memory 12 or directly to the persistent storage media 11 based on the determined first and second load-related information. For example, the logic 13 may be configured to determine a first latency for the IO request to be serviced by the persistent storage media 11, determine a second latency for the IO request to be serviced by the cache memory 12, and direct the IO request to either the persistent storage media 11 or the cache memory 12 based on the determined first and second latencies and a first IO request queue depth threshold (e.g., or other threshold related to load such as an outstanding block threshold, etc.). The logic 13 may also be configured to direct the IO request to either the persistent storage media 11 or the cache memory 12 based on an additive bandwidth and a second IO request queue depth threshold. In any of the embodiments herein, the cache memory 12 may include a write back cache memory and/or the persistent storage media 11 may include a SSD. In some embodiments, the logic 13 may be located in, or co-located with, various components, including a processor, a controller, the cache memory, etc. (e.g., on a same die).

Embodiments of each of the above persistent storage media 11, cache memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments or aspects of the logic 13 may be implemented by or integrated with a controller such as a general purpose controller, a special purpose controller, a memory controller, a storage controller, a storage manager, a processor, a central processor unit (CPU), a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the cache memory 12, persistent storage media 11, or other system memory may store a set of instructions which when executed by a controller cause the system 10 to implement one or more components, features, or aspects of the system 10 (e.g., the logic 13, determining the workload-related information, aggregating the bandwidth based on the determined workload information, etc.).

Figure 2:
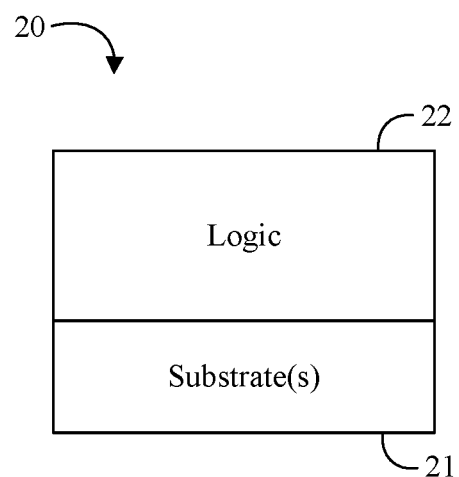
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine workload-related information for a persistent storage media and a cache memory, and aggregate a bandwidth of the persistent storage media and the cache memory based on the determined workload information. For example, the logic 22 may be configured to send an overflow IO operation to the persistent storage media based on the determined workload-related information. In some embodiments, the logic 22 may be further configured to determine first load-related information for the persistent storage media, determine second load-related information for the cache memory, and determine whether to send an IO request to the cache memory or directly to the persistent storage media based on the determined first and second load-related information. For example, the logic 22 may be configured to determine a first latency for the IO request to be serviced by the persistent storage media, determine a second latency for the IO request to be serviced by the cache memory, and direct the IO request to either the persistent storage media or the cache memory based on the determined first and second latencies and a first IO request queue depth threshold (e.g., or other threshold related to load such as an outstanding block threshold, etc.). The logic 22 may also be configured to direct the IO request to either the persistent storage media or the cache memory based on an additive bandwidth and a second IO request queue depth threshold. In any of the embodiments herein, the cache memory may include a write back cache memory and/or the persistent storage media may include a SSD. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 25 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
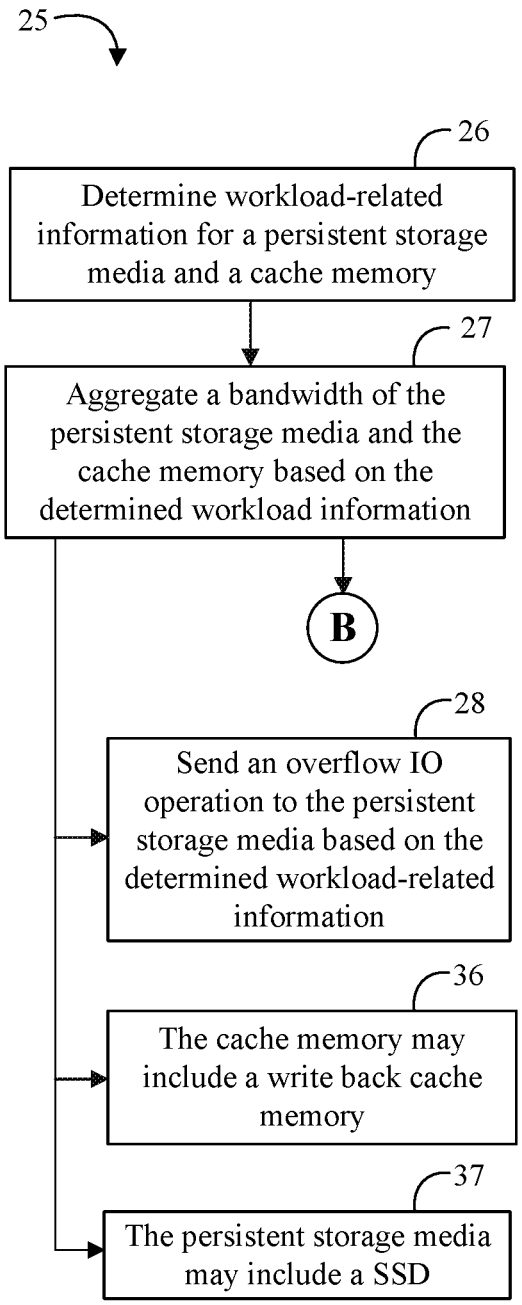
FIGS. 3A to 3C are flowcharts of an example of a method of managing storage according to an embodiment.
Figure 3B:
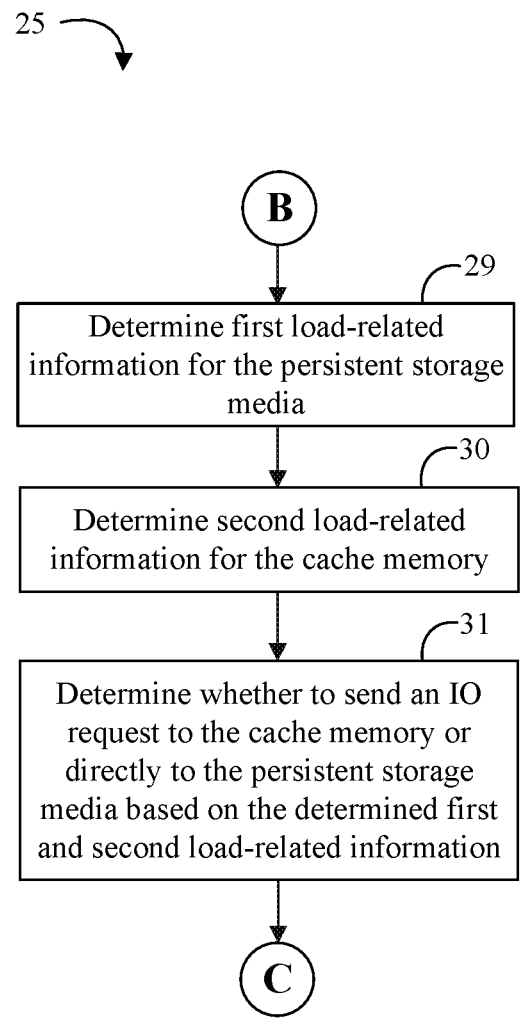
Figure 3C:
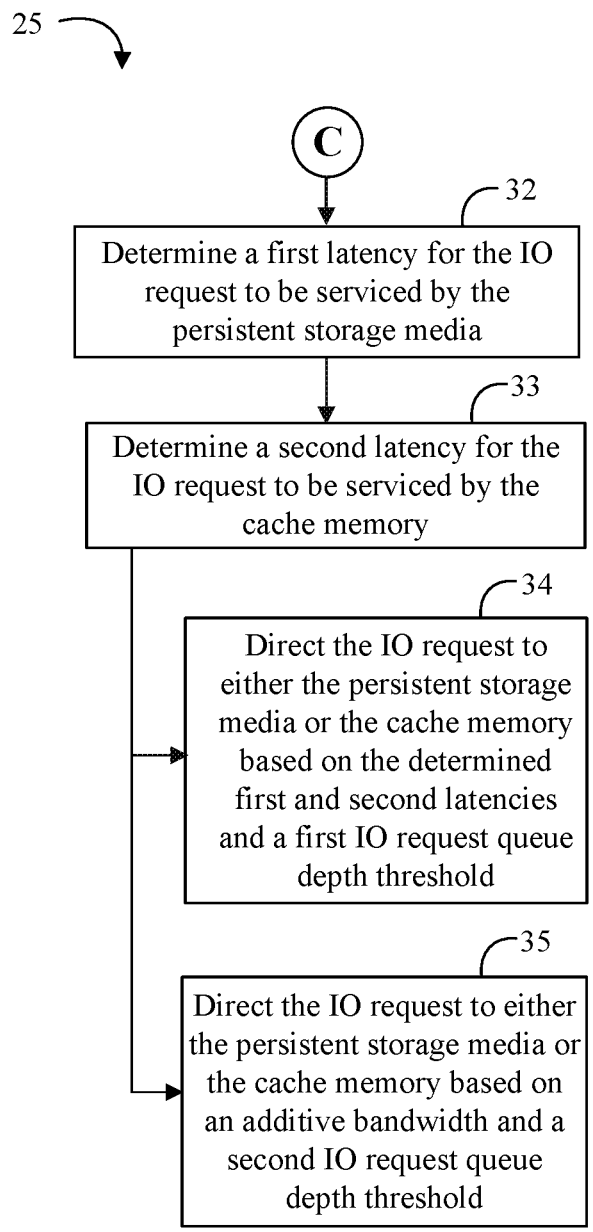

Turning now to FIGS. 3A to 3C, an embodiment of a method 25 of managing storage may include determining workload-related information for a persistent storage media and a cache memory at block 26, and aggregating a bandwidth of the persistent storage media and the cache memory based on the determined workload information at block 27. For example, the method 25 may include sending an overflow IO operation to the persistent storage media based on the determined workload-related information at block 28. Some embodiments of the method 25 may further include determining first load-related information for the persistent storage media at block 29, determining second load-related information for the cache memory at block 30, and determining whether to send an IO request to the cache memory or directly to the persistent storage media based on the determined first and second load-related information at block 31. For example, the method 25 may include determining a first latency for the IO request to be serviced by the persistent storage media at block 32, determining a second latency for the IO request to be serviced by the cache memory at block 33, directing the IO request to either the persistent storage media or the cache memory based on the determined first and second latencies and a first IO request queue depth threshold at block 34 (e.g., or other threshold related to load such as an outstanding block threshold, etc.), and/or directing the IO request to either the persistent storage media or the cache memory based on an additive bandwidth and a second IO request queue depth threshold at block 35. In any of the embodiments herein, the cache memory may include a write back cache memory at block 36, and/or the persistent storage media may include a SSD at block 37.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 23 to 29 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
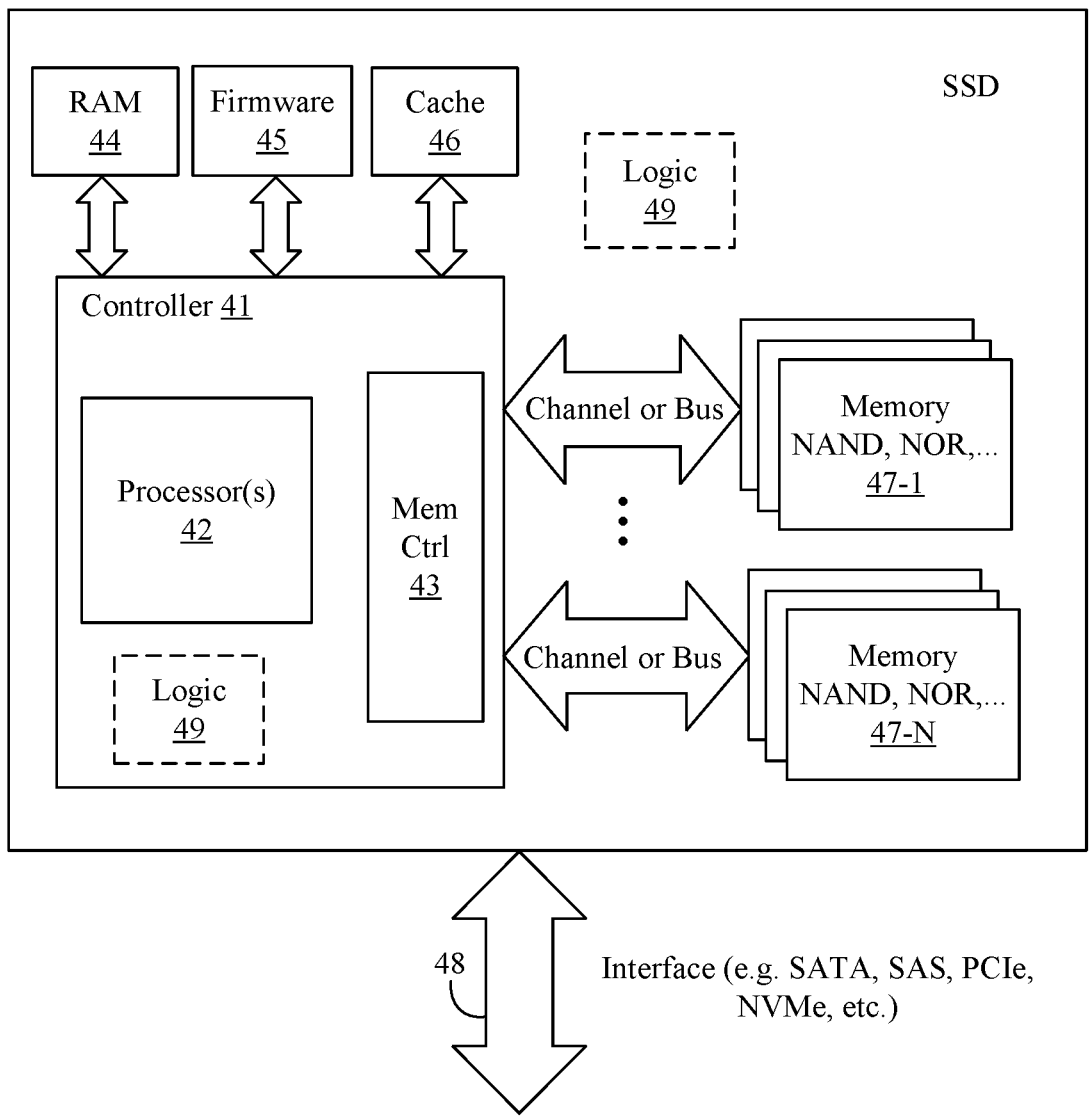
FIG. 4 is a block diagram of an example of a SSD according to an embodiment.

Turning now to FIG. 4, an embodiment of a SSD 40 may include technology to provide smart SSD functionality and/or compute-in-storage functionality. SSD 40 may include a controller 41 (which in turn includes one or more processor cores or processors 42 and memory controller logic 43), RAM 44, firmware storage 45, cache 46, and one or more memory modules or dies 47-1 to 47-N (which may include NAND flash, NOR flash, or other types of NVM/persistent storage media). Memory modules 47-1 to 47-N (collectively, media 47) may be coupled to the memory controller logic 43 via one or more memory channels or busses. Also, SSD 40 communicates with external devices/controllers via an interface 48 (e.g., such as a SCSI, SATA, SAS, PCIe, NVMe, etc., interface).

One or more of the features/aspects/operations of the embodiments herein may be performed by one or more of the components of the SSD 40. In particular, the SSD 40 may include logic 49 to determine workload-related information for the media 47 and a cache 46, and aggregate a bandwidth of the media 47 and the cache 46 based on the determined workload information. For example, the logic 49 may be configured to send an overflow IO operation to the media 47 based on the determined workload-related information. In some embodiments, the logic 49 may be further configured to determine first load-related information for the media 47, determine second load-related information for the cache 46, and determine whether to send an IO request to the cache 46 or directly to the media 47 based on the determined first and second load-related information. For example, the logic 49 may be configured to determine a first latency for the IO request to be serviced by the media 47, determine a second latency for the IO request to be serviced by the cache 46, and direct the IO request to either the media 47 or the cache 46 based on the determined first and second latencies and a first IO request queue depth threshold. The logic 49 may also be configured to direct the IO request to either the media 47 or the cache 46 based on an additive bandwidth and a second IO request queue depth threshold. In any of the embodiments herein, the cache 46 may include a write back cache memory. As illustrated in FIG. 4, logic 49 may distributed throughout various locations such as inside the SSD 40 or controller 41, etc. Also, one or more of the features/aspects/operations of the SSD 40 may be programmed into the RAM 44, firmware 45, and/or cache 46. For example, the processor 42 may be able to perform many or all of the features/aspects of the logic 49 with suitable instructions/data stored in the RAM 44, firmware 45, and/or cache 46.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Some embodiments may advantageously provide cache utilization of backing storage for aggregate bandwidth. When using a cache to accelerate a storage device, the cache device itself can become the bottleneck for demanding workloads. This is especially true when the cache device's performance for certain metrics is less than that of the backing storage device. For example, some SSDs may utilize 3D crosspoint technology (e.g., INTEL 3DXPOINT) for the cache device and quad-level cell (QLC) NAND memory for the backing storage device. For this configuration, the sequential write performance of the cache device may be nearly three times (3×) slower than that of the backing storage device. Some other systems may utilize redundant array of independent disks (RAID) technology to increase the bandwidth of the caching device, but this requires additional cache devices increasing cost and power. Some other systems may bypass certain metrics to attempts to bypass the kind of IO that each device can best handle (e.g., bypassing sequential IO read streams). Bypassing certain metrics may achieve the better performing metric of each device, however, it simply shifts the bottleneck to the backing storage device. In other words, the cache device and backing storage device are not used together. One may be sitting idle while the other device is overwhelmed with IO queueing up on the device.

In caching the traditional goal is generally to utilize the cache device as much as possible (e.g., because the cache device is assumed to be faster). Much cache research may be devoted to increasing the use of the cache device and in driving the hit rate to be as high as possible. Some embodiments, however, recognize this approach is not always optimal. When the caching device is busy and IO operations begin to be queued, for example, some embodiments may achieve a higher throughput by sending overflowing IO operations to the backing storage device. Some embodiments may advantageously achieve additive bandwidth for demanding workloads (e.g., aggregating the bandwidth to add the cache device bandwidth to the backing storage device bandwidth). For the example above (e.g., using 3D crosspoint memory as a cache for a QLC NAND-based SSD), some embodiments may aggregate the sequential write (e.g., queue depth=32 (QD32), 128k bits) performance of the cache device at about 360 MB/s with the sequential write performance of the backing storage device at about 980 MB/s to deliver an overall throughput of about 1340 MB/s.

Additionally, or alternatively, some embodiments may enable the caching system to send IO requests to the better performing device (e.g., the better of the cache device or the storage device) even at low queue depth for reduced latency. Some embodiments of the caching system may send IO to the lower latency device at low queue depth for a given metric. For high queue depth, some embodiments may use both the cache device and the backing storage device to achieve improved aggregated bandwidth or the maximum additive bandwidth.

Some embodiments may advantageously increase the performance of a caching solution. Additionally, some embodiments may provide aggregated cache-like devices, where the performance of the cache may be lower than that of the backing storage device for certain workload's metrics. For example, lower random write or sequential read performance. Finally, some embodiments may advantageously reduce the cost and/or power usage of a caching solution by reducing the amount of cache necessary to achieve high throughput. For example, in some embodiments the cache device does not need as much bandwidth due to parallelism with the backing storage device. Instead of adding more cache die, some embodiments may gain throughput via the backing storage device.

Figure 5:
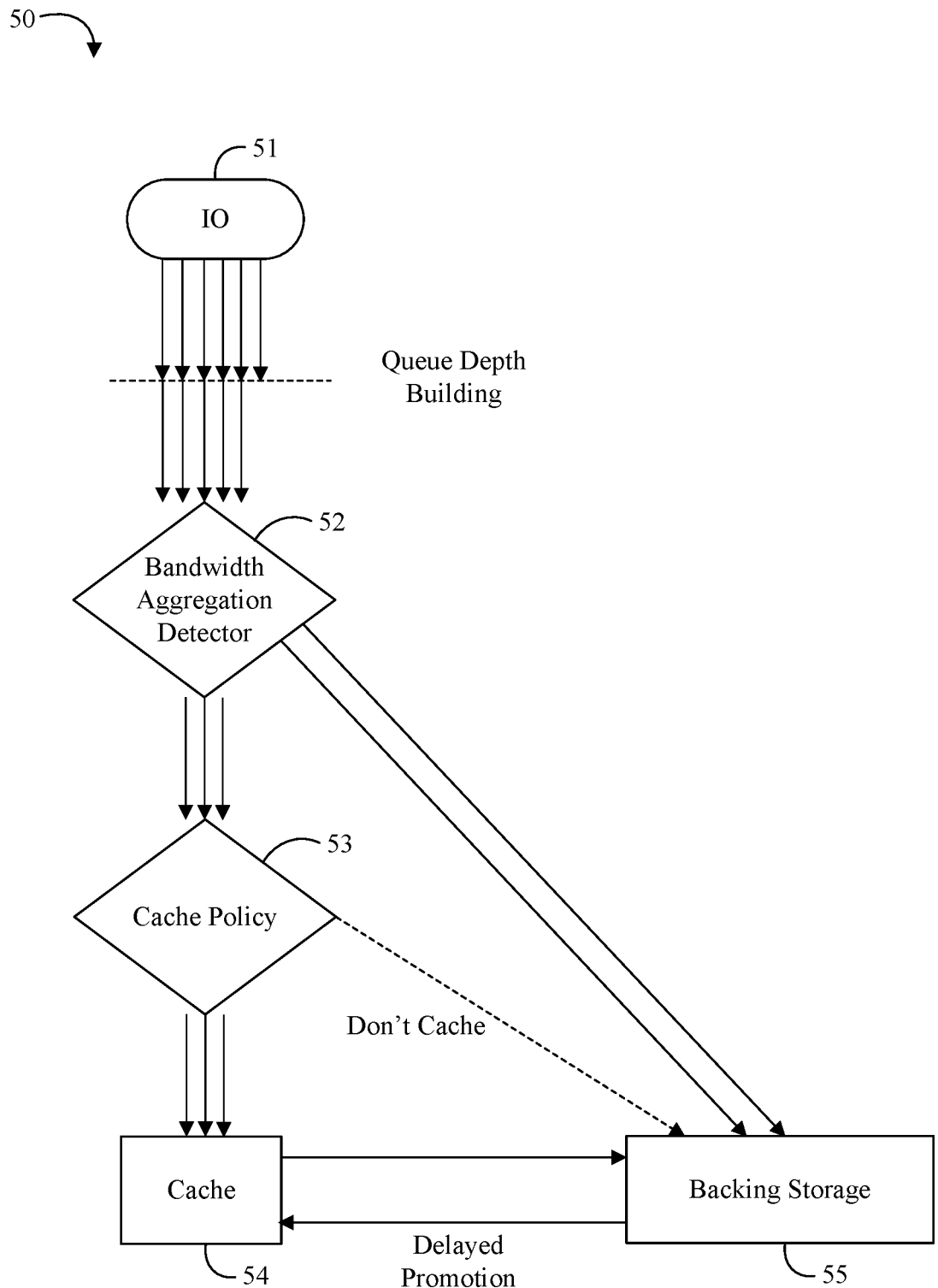
FIG. 5 is an illustrative diagram of an example of a process flow to manage IO requests according to an embodiment.

Turning now to FIG. 5, an embodiment of an illustrative process flow 50 show how some embodiments manage IO requests. As IO request(s) 51 arrive they are first intercepted by a bandwidth aggregation detector 52 which decides which device the IO request(s) 51 should be sent to, depending on the current load on each of the cache device 54 and the backing storage device 55. The detector 52 will either send the IO request(s) 51 directly to the backing storage device 55, or direct the IO request(s) 51 to be serviced from the cache device 54 using suitable cache internal policies and mechanisms 53. Some embodiments may address a number of challenges. For example, some embodiments may determine when the IO operation may be serviced by the backing storage device 55 while maintaining data coherence in the cache device 54. Some embodiments may also determine when the IO request(s) 51 should be sent to the backing storage device in order to improve the performance. Some embodiments may also determine the impact that bypassing IO may have upon traditional cache behavior (e.g., the likelihood that the data for an IO will be in cache when the cache is not under load).

Bypassing the Cache Examples

In this scenario, the cache may be assumed to be a write back cache. For a write through or write around cache, there may be no opportunity for bandwidth aggregation because all writes must go through to the backing storage device by definition. For a write operation, some embodiments may bypass the cache device anytime that the sectors are cache misses, or when the sectors in cache are idle as long as the system invalidates any data currently residing in cache. For a read operation, some embodiments may bypass the cache device anytime that the sectors are misses, or when the sectors are clean hits that have no outstanding writes to them. If the requested sector is dirty in the cache, and the system were to bypass the cache then stale data would be accessed from the backing storage device.

Sending Data to the Backing Storage Device for Performance Examples

These are non-limiting examples and those skilled in the art will appreciate that embodiments may include a wide variety of other technology approaches. Some embodiments may define the performance characteristics statically for a given device pair. For example, thresholds may define the maximum number of outstanding blocks that can be accessed on each device before switching to the other device. By using these thresholds, the cache system can send an IO request to the device that will result in the system completing the request in a shorter amount of time. The thresholds may include three values defined for specific workload's metrics including: 1) the number of sectors the cache device can handle for the workload; 2) the number of sectors that the backing storage can handle for the workload; and 3) if requests should be sent first to the backing storage device.

Figure 6:
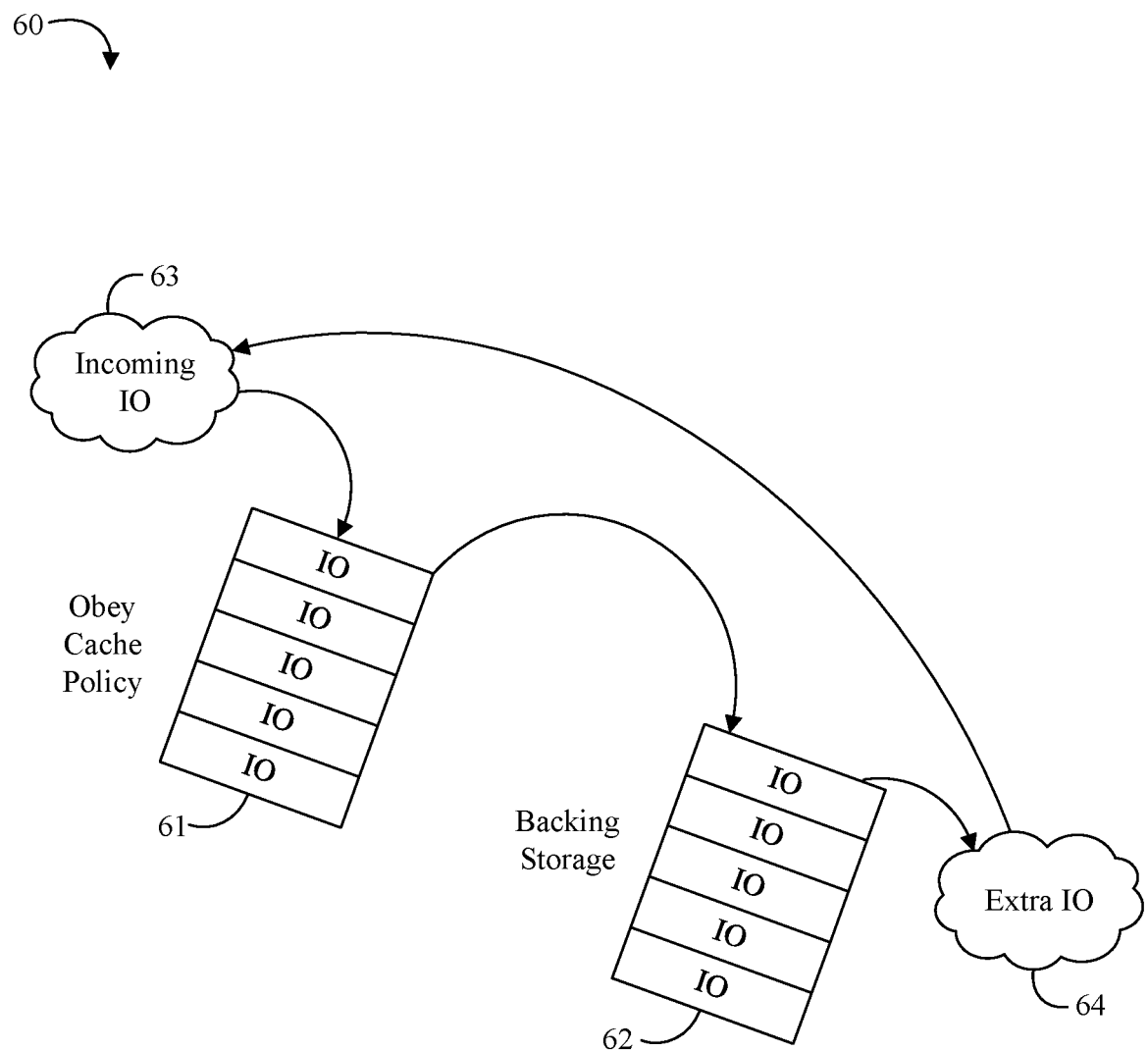
FIG. 6 is an illustrative diagram of another example of a process flow to manage IO requests according to an embodiment.

Turning now to FIG. 6, an embodiment of an illustrative process flow 60 may illustrate how some embodiments may utilize thresholds to manage IO requests. A storage system may include a first IO request queue 61 for the cache device and a second IO request queue 62 for the backing storage device. Incoming IO requests 63 may fill the first IO request queue 61. The thresholds may define the size of the first and second IO request queues 61, 62, and the workload may define which of the IO request queues 61, 62 to use and in which order. If the incoming IO 63 is a random read, for example, then the random read thresholds would be used. Additionally, note that the cache device's first IO request queue 61 obeys the applied cache policy. While the majority of the IO requests 63 may be sent to the actual cache device, the cache policy may sometime override the aggregation decision so that cache thrash does not become an issue.

The final choice about the two IO request queues 61, 62 is what to do with the extra IO requests 64 when both devices are fully utilized. For caching purposes, some embodiments may determine that it is better to send those extra IO requests 64 to the cache so that the cache can be hit later. Note that despite however the extra IO 64 is handled, as long as both devices are fully utilized, the maximum aggregate bandwidth may advantageously be achieved.

The number of workloads for which thresholds need to be defined may be determined based on the different performance characteristics of the storage devices involved. All of these thresholds may be considered to be a profile for the device pair. Some embodiments of a SSD may define separate thresholds for random reads, sequential reads, and one for both sequential and random writes (e.g., nine (9) values defined per device pair).

Figure 7A:
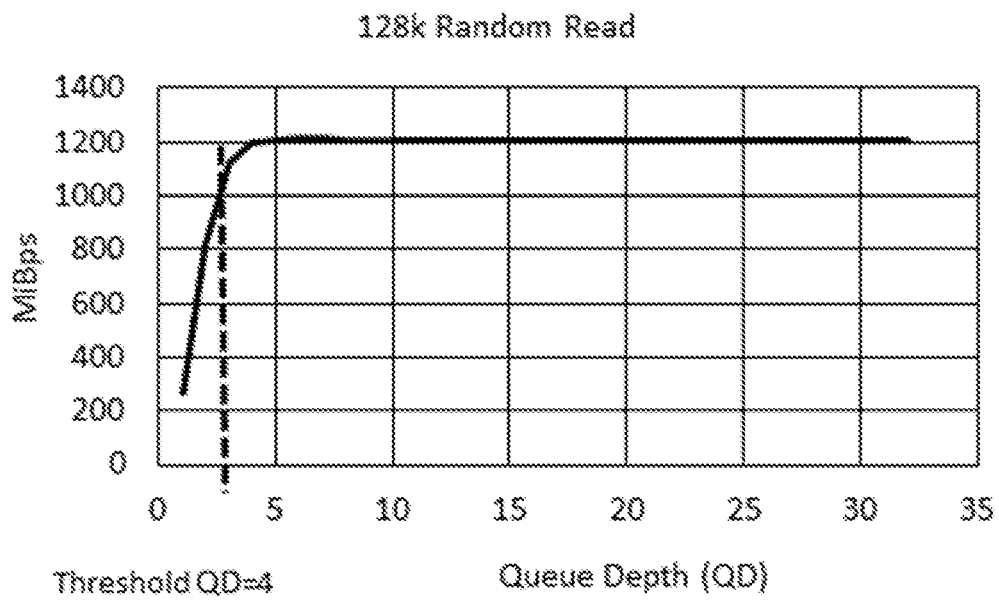
FIGS. 7A to 7C are illustrative graphs of examples of queue depth versus bandwidth according to embodiments.
Figure 7B:
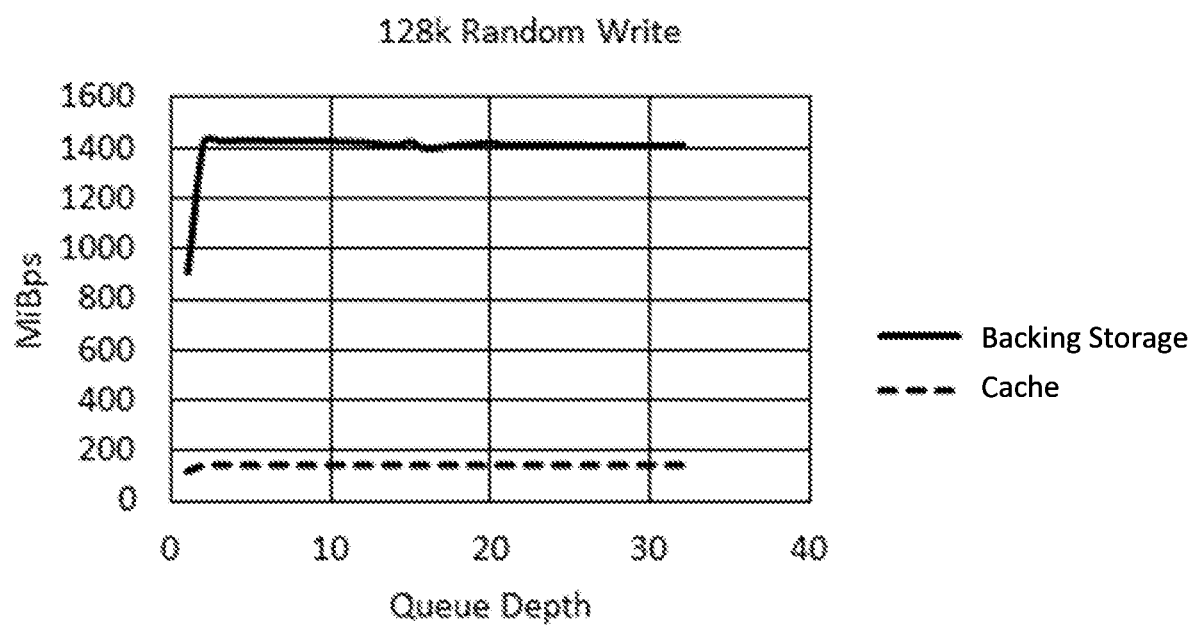
Figure 7C:
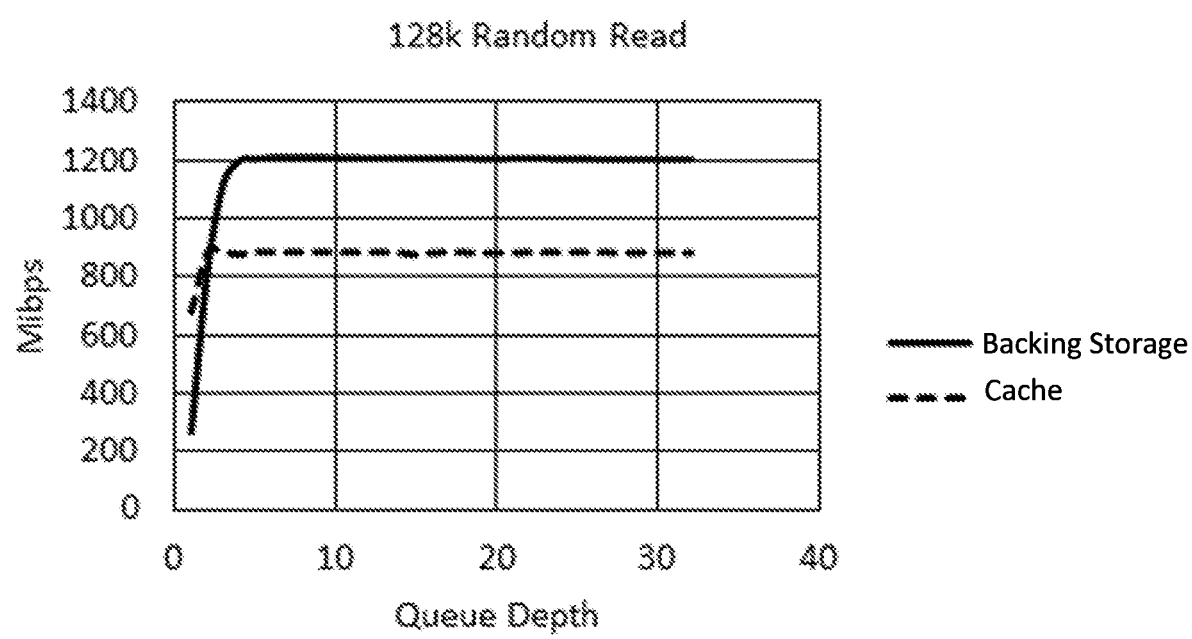

Turning now to FIGS. 7A to 7C, illustrative graphs show examples of how to determine various thresholds for some embodiments. In this example, the cache device may correspond to a 16 GB 3D crosspoint memory technology and the backing storage device may correspond to a 1 TB QLC NAND-based storage technology. The number of sectors a device can handle may be obtained deterministically by adjusting the queue depth of a workload and determining where the bandwidth levels off. FIG. 7A shows that for the device where the information was gathered (e.g., the example 1 TB backing storage device) the threshold for random reads occurs at QD4 or when 128k*4 or 1024 sectors are outstanding on the device. The same deterministic analysis may be used to determine the thresholds for writes, sequential reads, etc. for each device of the storage system.

Once the thresholds for all the relevant/desired workloads have been identified, embodiments of the detector/logic may determine whether IO requests should be sent to the backing storage device first (e.g., bypassing the cache). For example, some embodiments may compare the information collected to determine the number of sectors each device can handle for the workload. FIG. 7B compares the write performance of the example cache device to the example backing storage device. As shown in FIG. 7B, the write performance of the backing storage device may be much better that of the cache device. Some embodiments may determine that writes are best when sent to the backing storage device until its maximum bandwidth is achieved, and then sent to the cache device.

On the other hand, FIG. 7C compares the 128k random read performance of the two example devices. For this workload, FIG. 7C shows that even though the backing storage device achieves a higher bandwidth for most queue depths, the cache device has better bandwidth for low queue depth. For example, this may be due to the lower latency of the cache device's 3D crosspoint media. For read requests, some embodiments may send IO to the cache device first until the cache device reaches its maximum bandwidth and then send the IO to the backing storage device.

Maintaining Other Cache Behavior Examples

Depending on the thresholds chosen, some embodiments may optionally include technology to maintain some other traditional cache behaviors. For example, if the cache hit remains high with the selected thresholds, extra effort may not be needed. Where beneficial or needed, however, some embodiments may provide delayed promotions (e.g., see. FIG. 5) or deferred insertions in the cache device. For example, some embodiments may remember the IO that was bypassed due to aggregation and may promote the sectors at a later time when the system is not fully utilizing its devices. If an IO is to be bypassed due to aggregation, but the regular cache policies say that it should be promoted into cache, some embodiments may record those cache frames for later insertion. The delayed promotion allows the data to eventually be placed in the cache, which may provide more options for bandwidth aggregation for subsequent read operations.

Figure 8:
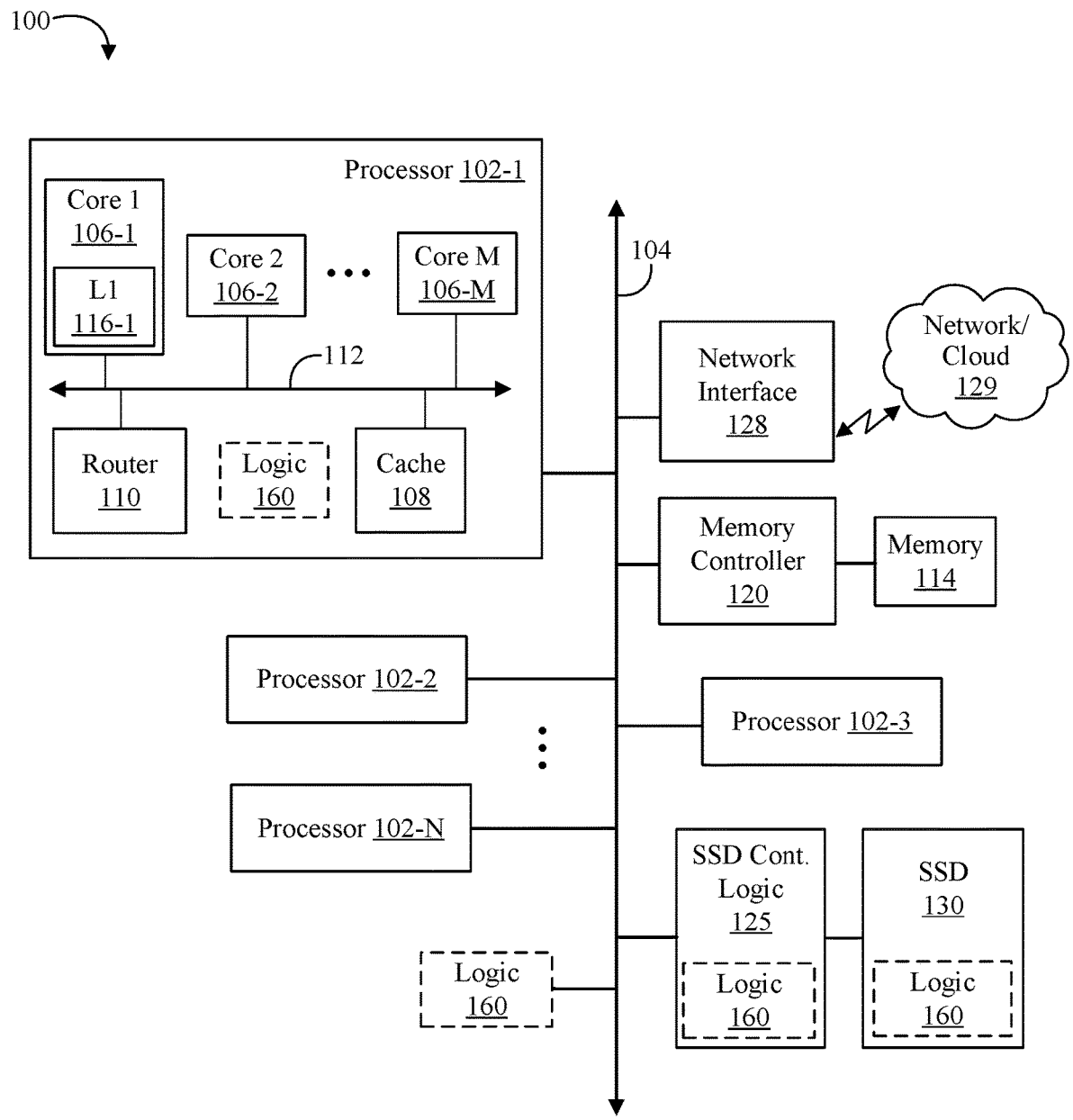
FIG. 8 is a block diagram of an example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 160, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 8, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, memory 114 may be coupled to other components of system 100 through a memory controller 120. Memory 114 includes volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include Non-Volatile (NV) storage device such as a SSD 130 coupled to the interconnect 104 via SSD controller logic 125. Hence, logic 125 may control access by various components of system 100 to the SSD 130. In some embodiments, the SSD 130 may include similar technology as discussed in connection with the SSD 40 (FIG. 4). Furthermore, even though logic 125 is shown to be directly coupled to the interconnection 104 in FIG. 8, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc. Additionally, logic 125 may be incorporated into memory controller logic or provided on a same integrated circuit (IC) device in various embodiments (e.g., on the same IC device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein such as those discussed with reference to other figures including FIGS. 1-7C, for example), including the cores 106, interconnections 104 or 112, components outside of the processor 102, SSD 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc. As shown in FIG. 8, features or aspects of the logic 125 and/or the logic 160 may be distributed throughout the system 100, and/or co-located/integrated with various components of the system 100.

As illustrated in FIG. 8, SSD 130 may include logic 160, which may be in the same enclosure as the SSD 130 and/or fully integrated on a printed circuit board (PCB) of the SSD 130. Logic 160 advantageously provides technology to aggregate bandwidth of the SSD 130 based on a determined workload. For example, the logic 160 may implement one or more aspects of the method 25 (FIGS. 3A to 3C), the process flow 50 (FIG. 5) and/or the process flow 60 (FIG. 6). For example, the logic 160 may further include technology to determine workload-related information for the SSD 130, and aggregate a bandwidth of the SSD 130 (e.g., including a cache and backing storage) based on the determined workload information. For example, the logic 160 may be configured to send an overflow IO operation to the backing storage based on the determined workload-related information. In some embodiments, the logic 160 may be further configured to determine first load-related information for the backing storage, determine second load-related information for the SSD cache, and determine whether to send an IO request to the SSD cache or directly to the backing storage based on the determined first and second load-related information. For example, the logic 160 may be configured to determine a first latency for the IO request to be serviced by the backing storage, determine a second latency for the IO request to be serviced by the SSD cache, and direct the IO request to either the backing storage or the SSD cache based on the determined first and second latencies and a first IO request queue depth threshold. The logic 160 may also be configured to direct the IO request to either the backing storage or the SSD cache based on an additive bandwidth and a second IO request queue depth threshold. In any of the embodiments herein, the SSD cache may include a write back cache memory. In other embodiments, the SSD 130 may be replaced with any suitable storage technology/media. In some embodiments, the logic 160 may be coupled to one or more substrates (e.g., silicon, sapphire, gallium arsenide, PCB, etc.), and may include transistor channel regions that are positioned within the one or more substrates.

Additional Notes and Examples

Example 1 may include an electronic storage system, comprising persistent storage media, cache memory, and logic communicatively coupled to the persistent storage media and the cache memory to determine workload-related information for the persistent storage media and the cache memory, and aggregate a bandwidth of the persistent storage media and the cache memory based on the determined workload information.

Example 2 may include the system of Example 1, wherein the logic is further to send an overflow IO operation to the persistent storage media based on the determined workload-related information.

Example 3 may include the system of any of Examples 1 to 2, wherein the logic is further to determine first load-related information for the persistent storage media, determine second load-related information for the cache memory, and determine whether to send an IO request to the cache memory or directly to the persistent storage media based on the determined first and second load-related information.

Example 4 may include the system of Example 3, wherein the logic is further to determine a first latency for the IO request to be serviced by the persistent storage media, determine a second latency for the IO request to be serviced by the cache memory, and direct the IO request to either the persistent storage media or the cache memory based on the determined first and second latencies and a first IO request queue depth threshold.

Example 5 may include the system of Example 4, wherein the logic is further to direct the IO request to either the persistent storage media or the cache memory based on an additive bandwidth and a second IO request queue depth threshold.

Example 6 may include the system of any of Examples 1 to 5, wherein the cache memory comprises a write back cache memory.

Example 7 may include the system of any of Examples 1 to 6, wherein the persistent storage media comprises a solid state drive.

Example 8 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to determine workload-related information for a persistent storage media and a cache memory, and aggregate a bandwidth of the persistent storage media and the cache memory based on the determined workload information.

Example 9 may include the apparatus of Example 8, wherein the logic is further to send an overflow IO operation to the persistent storage media based on the determined workload-related information.

Example 10 may include the apparatus of any of Examples 8 to 9, wherein the logic is further to determine first load-related information for the persistent storage media, determine second load-related information for the cache memory, and determine whether to send an IO request to the cache memory or directly to the persistent storage media based on the determined first and second load-related information.

Example 11 may include the apparatus of Example 10, wherein the logic is further to determine a first latency for the IO request to be serviced by the persistent storage media, determine a second latency for the IO request to be serviced by the cache memory, and direct the IO request to either the persistent storage media or the cache memory based on the determined first and second latencies and a first IO request queue depth threshold.

Example 12 may include the apparatus of Example 11, wherein the logic is further to direct the IO request to either the persistent storage media or the cache memory based on an additive bandwidth and a second IO request queue depth threshold.

Example 13 may include the apparatus of any of Examples 8 to 12, wherein the cache memory comprises a write back cache memory.

Example 14 may include the apparatus of any of Examples 8 to 13, wherein the persistent storage media comprises a solid state drive.

Example 15 may include the apparatus of any of Examples 8 to 14, wherein the logic coupled to the one or more substrates includes transistor channel regions that are positioned within the one or more substrates.

Example 16 may include a method of managing storage, comprising determining workload-related information for a persistent storage media and a cache memory, and aggregating a bandwidth of the persistent storage media and the cache memory based on the determined workload information.

Example 17 may include the method of Example 16, further comprising sending an overflow IO operation to the persistent storage media based on the determined workload-related information.

Example 18 may include the method of any of Examples 16 to 17, further comprising determining first load-related information for the persistent storage media, determining second load-related information for the cache memory, and determining whether to send an IO request to the cache memory or directly to the persistent storage media based on the determined first and second load-related information.

Example 19 may include the method of Example 18, further comprising determining a first latency for the IO request to be serviced by the persistent storage media, determining a second latency for the IO request to be serviced by the cache memory, and directing the IO request to either the persistent storage media or the cache memory based on the determined first and second latencies and a first IO request queue depth threshold.

Example 20 may include the method of Example 19, further comprising directing the IO request to either the persistent storage media or the cache memory based on an additive bandwidth and a second IO request queue depth threshold.

Example 21 may include the method of any of Examples 16 to 20, wherein the cache memory comprises a write back cache memory.

Example 22 may include the method of any of Examples 16 to 21, wherein the persistent storage media comprises a solid state drive.

Example 23 may include at least one computer readable storage medium, comprising a set of instructions, which when executed by a computing device, cause the computing device to determine workload-related information for a persistent storage media and a cache memory, and aggregate a bandwidth of the persistent storage media and the cache memory based on the determined workload information.

Example 24 may include the at least one computer readable storage medium of Example 23, comprising a further set of instructions, which when executed by the computing device, cause the computing device to send an overflow IO operation to the persistent storage media based on the determined workload-related information.

Example 25 may include the at least one computer readable storage medium of any of Examples 23 to 24, comprising a further set of instructions, which when executed by the computing device, cause the computing device to determine first load-related information for the persistent storage media, determine second load-related information for the cache memory, and determine whether to send an IO request to the cache memory or directly to the persistent storage media based on the determined first and second load-related information.

Example 26 may include the at least one computer readable storage medium of Example 25, comprising a further set of instructions, which when executed by the computing device, cause the computing device to determine a first latency for the IO request to be serviced by the persistent storage media, determine a second latency for the IO request to be serviced by the cache memory, and direct the IO request to either the persistent storage media or the cache memory based on the determined first and second latencies and a first IO request queue depth threshold.

Example 27 may include the at least one computer readable storage medium of Example 26, comprising a further set of instructions, which when executed by the computing device, cause the computing device to direct the IO request to either the persistent storage media or the cache memory based on an additive bandwidth and a second IO request queue depth threshold.

Example 28 may include the at least one computer readable storage medium of any of Examples 23 to 27, wherein the cache memory comprises a write back cache memory.

Example 29 may include the at least one computer readable storage medium of any of Examples 23 to 28, wherein the persistent storage media comprises a solid state drive.

Example 30 may include a storage manager apparatus, comprising means for determining workload-related information for a persistent storage media and a cache memory, and means for aggregating a bandwidth of the persistent storage media and the cache memory based on the determined workload information.

Example 31 may include the apparatus of Example 30, further comprising means for sending an overflow IO operation to the persistent storage media based on the determined workload-related information.

Example 32 may include the apparatus of any of Examples 30 to 31, further comprising means for determining first load-related information for the persistent storage media, means for determining second load-related information for the cache memory, and means for determining whether to send an IO request to the cache memory or directly to the persistent storage media based on the determined first and second load-related information.

Example 33 may include the apparatus of Example 32, further comprising means for determining a first latency for the IO request to be serviced by the persistent storage media, means for determining a second latency for the IO request to be serviced by the cache memory, and means for directing the IO request to either the persistent storage media or the cache memory based on the determined first and second latencies and a first IO request queue depth threshold.

Example 34 may include the apparatus of Example 33, further comprising means for directing the IO request to either the persistent storage media or the cache memory based on an additive bandwidth and a second IO request queue depth threshold.

Example 35 may include the apparatus of any of Examples 30 to 34, wherein the cache memory comprises a write back cache memory.

Example 36 may include the apparatus of any of Examples 30 to 35, wherein the persistent storage media comprises a solid state drive.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus for use with a persistent storage media and a cache memory, the semiconductor apparatus comprising:
    one or more substrates; and
    logic coupled to the one or more substrates, wherein the logic is at least partly implemented in one or more of configurable logic and fixed-functionality hardware logic, the logic coupled to the one or more substrates to:
        determine workload-related information for the persistent storage media and the cache memory;
        determine a first latency for an IO request to be serviced by the persistent storage media;
        determine a second latency for the IO request to be serviced by the cache memory;
        direct the IO request to either the persistent storage media or the cache memory based on the determined first and second latencies and a first IO request queue depth threshold, wherein the IO request is only sent to the persistent storage media or the cache memory with a lowest comparative latency between the first and second latencies when the first IO request queue depth threshold is exceeded, and wherein the IO request is sent to both the persistent storage media and the cache memory in parallel when the first IO request queue depth threshold is exceeded;
        aggregate a bandwidth of the persistent storage media and the cache memory based on the determined workload information;
        track whether the cache memory is bypassed due to aggregation of the bandwidth; and
        promote IO requests from the persistent storage media to the cache memory at a later time in response to tracking whether the cache memory is bypassed and in response to a determination that the cache memory is underutilized.

2. The semiconductor apparatus for use with a persistent storage media and a cache memory of claim 1, wherein the logic is further to:
    send an overflow IO operation to the persistent storage media based on the determined workload-related information.

3. The semiconductor apparatus for use with a persistent storage media and a cache memory of claim 1, wherein the logic is further to:
    determine first load-related information for the persistent storage media;
    determine second load-related information for the cache memory; and
    determine whether to send the IO request to the cache memory or directly to the persistent storage media based on the determined first and second load-related information.

4. The semiconductor apparatus for use with a persistent storage media and a cache memory of claim 3, wherein the logic is further to:
    direct the IO request to either the persistent storage media or the cache memory based on an additive bandwidth and a second IO request queue depth threshold.

5. The semiconductor apparatus for use with a persistent storage media and a cache memory of claim 1, wherein the cache memory comprises a write back cache memory.

6. The semiconductor apparatus for use with a persistent storage media and a cache memory of claim 1, wherein the persistent storage media comprises a solid state drive.

7. The semiconductor apparatus for use with a persistent storage media and a cache memory of claim 1, wherein the logic coupled to the one or more substrates includes transistor channel regions that are positioned within the one or more substrates.

8. An electronic storage system, comprising:
    persistent storage media;
    cache memory; and
    logic communicatively coupled to the persistent storage media and the cache memory to:
        determine workload-related information for the persistent storage media and the cache memory;
        determine a first latency for an IO request to be serviced by the persistent storage media;

determine a second latency for the IO request to be serviced by the cache memory;

direct the IO request to either the persistent storage media or the cache memory based on the determined first and second latencies and a first IO request queue depth threshold, wherein the IO request is only sent to the persistent storage media or the cache memory with a lowest comparative latency between the first and second latencies when the first IO request queue depth threshold is not exceeded, and wherein the IO request is sent to both the persistent storage media and the cache memory in parallel when the first IO request queue depth threshold is exceeded;

aggregate a bandwidth of the persistent storage media and the cache memory based on the determined workload information;

track whether the cache memory is bypassed due to aggregation of the bandwidth; and promote IO requests from the persistent storage media to the cache memory at a later time in response to tracking whether the cache memory is bypassed and in response to a determination that the cache memory is underutilized.

9. The electronic storage system of claim 8, wherein the logic is further to:

send an overflow IO operation to the persistent storage media based on the determined workload-related information.

10. The electronic storage system of claim 8, wherein the logic is further to:

determine first load-related information for the persistent storage media;

determine second load-related information for the cache memory; and determine whether to send the TO request to the cache memory or directly to the persistent storage media based on the determined first and second load-related information.

11. The electronic storage system of claim 10, wherein the logic is further to:

direct the TO request to either the persistent storage media or the cache memory based on an additive bandwidth and a second TO request queue depth threshold.

12. The electronic storage system of claim 8, wherein the cache memory comprises a write back cache memory.

13. The electronic storage system of claim 8, wherein the persistent storage media comprises a solid state drive.

14. A method of managing storage, comprising:

determining workload-related information for a persistent storage media and a cache memory;

determining a first latency for an TO request to be serviced by the persistent storage media;

determining a second latency for the TO request to be serviced by the cache memory;

directing the TO request to either the persistent storage media or the cache memory based on the determined first and second latencies and a first TO request queue depth threshold, wherein the TO request is only sent to the persistent storage media or the cache memory with a lowest comparative latency between the first and second latencies when the first TO request queue depth threshold is not exceeded, and wherein the TO request is sent to both the persistent storage media and the cache memory in parallel when the first TO request queue depth threshold is exceeded;

aggregating a bandwidth of the persistent storage media and the cache memory based on the determined workload information;

tracking whether the cache memory is bypassed due to aggregation of the bandwidth; and promoting IO requests from the persistent storage media to the cache memory at a later time in response to tracking whether the cache memory is bypassed and in response to a determination that the cache memory is underutilized.

15. The method of claim 14, further comprising:

sending an overflow IO operation to the persistent storage media based on the determined workload-related information.

16. The method of claim 14, further comprising:

determining first load-related information for the persistent storage media;

determining second load-related information for the cache memory; and determining whether to send the IO request to the cache memory or directly to the persistent storage media based on the determined first and second load-related information.

17. The method of claim 16, further comprising:

directing the IO request to either the persistent storage media or the cache memory based on an additive bandwidth and a second IO request queue depth threshold.

* * * * *